United States Patent
Pahle

(10) Patent No.: US 7,918,322 B2
(45) Date of Patent: Apr. 5, 2011

(54) SYSTEM FOR CONNECTING A BRAKE DISC AND HUB

(75) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/941,362

(22) Filed: Nov. 16, 2007

(65) Prior Publication Data

US 2008/0128229 A1 Jun. 5, 2008

Related U.S. Application Data

(63) Continuation of application No. PCT/EP2006/004644, filed on May 17, 2006.

(30) Foreign Application Priority Data

May 17, 2005 (DE) .......................... 10 2005 023 380

(51) Int. Cl.
*B60T 1/06* (2006.01)
*F16D 65/12* (2006.01)

(52) U.S. Cl. ................................. 188/18 A; 188/218 XL

(58) Field of Classification Search .................... 188/17, 188/18 R, 18 A, 218 XL, 218 R; 301/6.1, 301/6.8
See application file for complete search history.

(56) References Cited

U.S. PATENT DOCUMENTS

| 3,754,624 | A | * | 8/1973 | Eldred | 188/71.5 |
|---|---|---|---|---|---|
| 4,645,041 | A | * | 2/1987 | Bass | 188/218 XL |
| 4,821,848 | A | * | 4/1989 | Izumine | 188/218 XL |
| 5,297,660 | A | | 3/1994 | Wiebelhaus et al. | |
| 5,520,269 | A | * | 5/1996 | Yamamoto et al. | 188/218 XL |
| 6,267,210 | B1 | * | 7/2001 | Burgoon et al. | 188/218 XL |
| 6,564,913 | B2 | | 5/2003 | Baumgartner et al. | |
| 6,910,556 | B1 | | 6/2005 | Baumgartner et al. | |
| 2005/0082125 | A1 | * | 4/2005 | Gehrs | 188/218 XL |
| 2005/0161296 | A1 | * | 7/2005 | Okabe | 188/218 XL |
| 2007/0181388 | A1 | | 8/2007 | Schlitz et al. | |
| 2008/0264741 | A1 | * | 10/2008 | Fujita et al. | 188/18 A |

FOREIGN PATENT DOCUMENTS

| DE | 1 836 832 U | 8/1961 |
|---|---|---|
| DE | 1 914 409 | 10/1970 |
| DE | 1 945 934 | 3/1971 |
| DE | 198 36 688 A1 | 3/2000 |
| DE | 199 18 069 A1 | 11/2000 |
| DE | 100 46 705 C1 | 7/2002 |

(Continued)

OTHER PUBLICATIONS

Machine translation of DE 1945934 obtained from EPO website.*
International Search Report (Form PCT/ISA/210) dated Sep. 6, 2006, with English translation of relevant portion (Six (6) pages).

(Continued)

*Primary Examiner* — Thomas J Williams
(74) *Attorney, Agent, or Firm* — Crowell & Moring LLP

(57) ABSTRACT

A brake disc/hub connection for connecting a brake disc to a brake disc hub includes supporting elements on the inner circumference of the brake disc. The brake disc hub is provided with bosses or cams on the outer circumference. Intermediate elements, which protrude into intermediate spaces provided between the bosses and the supporting elements, are distributed between the brake disc hub and the brake disc in the circumferential direction and ensure transmission of the braking torque from the brake disc to the brake disc hub. Each intermediate element rests in a radially secured manner on the associated support element and boss by way of shaping.

20 Claims, 3 Drawing Sheets

FOREIGN PATENT DOCUMENTS

| | | |
|---|---|---|
| DE | 101 59 799 A1 | 6/2003 |
| DE | 103 21 795 B3 | 1/2005 |
| EP | 1 384 009 B1 | 1/2004 |
| GB | 2184801 A * | 7/1987 |
| JP | 62266233 A * | 11/1987 |

OTHER PUBLICATIONS

Notification of the First Office Action dated Apr. 10, 2009, in Chinese application 200680016849.1, with an English translation (Thirteen (13) pages).

* cited by examiner

SYSTEM FOR CONNECTING A BRAKE DISC AND HUB

CROSS-REFERENCE TO RELATED APPLICATIONS

This application is a continuation of PCT International Application No. PCT/EP2006/004644, filed on May 17, 2006, which claims priority under 35 U.S.C. §119 to German Application No. 10 2005 023 380.5, filed May 17, 2005, the entire disclosures of which are expressly incorporated by reference herein.

BACKGROUND AND SUMMARY OF THE INVENTION

The present invention relates to a system for connecting a brake disc and hub, wherein the brake disc has supporting elements on an inner circumference and the brake disc hub is provided with bosses on the outer circumference. Between the brake disc hub and the brake disc, intermediate elements are distributed in the circumferential direction, which intermediate elements project into interspaces provided between the bosses and the supporting elements and ensure a transmission of the braking torque from the brake disc to the brake disc hub.

Utilizing disc brakes, a vehicle may be decelerated as a result of the conversion of kinetic energy into heat, which occurs when the brake linings come to bear frictionally against the brake disc.

During the braking operation, the brake disc, on the one hand, has to transfer circumferential forces to a wheel to which the brake disc is indirectly connected. On the other hand, the brake disc has to store frictional heat occurring during braking and discharge it into the surroundings.

The interaction of these influences may lead under high stresses to a creeping of the brake disc material and, during subsequent cooling, to surface cracks. In this case, these cracks occur particularly quickly when, as a consequence of design, a thermal expansion of the brake disc is suppressed and therefore additional thermal stresses arise.

This problem is reduced by the brake disc being separated materially from the brake disc hub to which the brake disc is fastened as a separate component. The brake disc therefore has the possibility of expanding radially under the influence of heat.

In order to achieve this, it is known to fix the brake disc radially to the brake disc hub to only a minimal extent, so that the brake disc can expand radially relatively freely under heating.

Nevertheless, cracks in the brake disc may occur, which, under certain circumstances, lead to a complete through-crack, with the result that entire brake disc segments may break-off because the brake disc is fixed radially to only a slight extent. These parts may be thrown outward explosively, thus obviously resulting in a considerable potential for hazardous situations.

It is known from German patent document DE 103 21 795 B3 not to design the intermediate elements as bolts, but, instead, as bent sheet metal parts which, however, do not eliminate the problem described above.

German patent document DE 18 36 832 U shows, as intermediate elements, an eccentric roller arrangement as discussed above.

Furthermore, German patent document DE 100 46 705 C1, DE 101 59 799 A1, DE 199 18 069 A1 and DE 19 14 409 A provide background material regarding the disc hub connection.

A generic brake disc/hub connection is known from European patent document EP 1 384 009 B1, in which the intermediate elements consist of bolts that are seated in interspaces formed between the bosses and the supporting elements, and thus make it possible to transmit the braking torque from the brake disc to the brake disc hub.

Although, in this design, the brake disc can expand radially, there is nevertheless no safeguard which prevents parts of the brake from being thrown outward in the event of a cracking of the brake disc.

The object on which the present invention is based, therefore, is to develop further a brake disc/hub connection such that the operating reliability of the brake disc is improved.

The invention provides a system for connecting a brake disc and hub, wherein the brake disc has supporting elements on an inner circumference and the brake disc hub is provided with bosses on the outer circumference. Between the brake disc hub and the brake disc, intermediate elements are distributed in the circumferential direction, which intermediate elements project into interspaces provided between the bosses and the supporting elements and ensure a transmission of the braking torque from the brake disc to the brake disc hub. Each intermediate element bears both, secured radially by shaping, against the assigned supporting element in a depression and, secured radially by shaping, against the boss in a depression.

This design affords a brake disc/hub connection in which a dislodgement of brake disc segments, which have occurred due to a continuous crack in the brake ring, is virtually ruled out.

The intermediate elements serve, as it were, for radial securing, which hold such brake disc segments in their position and therefore maintain the functioning capacity of the brake to an extent such that no complete failure of the brake occurs. The intermediate elements thus serve for largely securing the brake disc against displacement with respect to the brake disc hub, the thermal expansion of the brake disc in relation to the brake disc hub being ensured in an operating situation in that the intermediate element bears with slight radial play against the supporting element and/or the boss.

For this purpose, provision may be made for the respective intermediate element to be covered by the assigned boss in the radial direction, in regions, at a short distance on the side otherwise facing away from the brake disc hub. The intermediate element, which, in this case, comes to bear, secured against displacement, on the supporting element of the brake disc, can travel radially according to the distance dimension in the event of the expansion of the brake disc. In principle, however, it is also contemplated to design the supporting element such that it covers the intermediate element at a short distance in the inwardly directed radial region, while it bears against the boss so as to be secured against displacement or so as likewise to be slightly movable.

In order to minimize the transmission of heat from the brake disc to the brake disc hub, the intermediate element preferably consists of a steel having low thermal conductivity, for example of stainless steel.

The intermediate element may be designed as a flat part, which is folded out of a metal sheet and which fills virtually the entire interspace present between the boss and the supporting element.

It is also contemplated, however, to design the intermediate element as a bolt, as is shown in the European patent document EP 1 384 009 B1 mentioned above.

Apart from the brake disc/bolt/brake disc hub contact regions, there is no direct contact between the supporting element and the boss. In the remaining region, the heat can be transferred only by radiation from the brake disc to the brake disc hub. This is advantageous insofar as heat transport due to radiation decreases with an increased distance between the heat-discharging part and the heat-absorbing part, that is to say, here, the width of the interspace, and is substantially lower than would be the case if there was direct contact between the structural elements.

Where very hard material is concerned, the contact region of the bolt on the supporting element or on the boss is restricted, in the most unfavorable case, to linear contact, with the result that local overloads and plastic deformations may occur. In order to prevent this from happening, the bolt should have high elastic deformability. For this purpose, the bolt may be designed as a hollow body, preferably a tubular body. The contact regions are enlarged as a result, and stresses which occur are reduced.

Preferably, the intermediate element is designed as a bolt, which is seated partially in the depression of the supporting element and partially in the depression of the boss. The intermediate element designed in this way can be produced cost-effectively and, nevertheless, ensures excellent securing of the brake disc in accordance with the invention.

Preferably, in the embodiment wherein the intermediate element is a bolt, the latter lies over a large area in a depression of the supporting element, on account of the relatively lower strength of the brake disc, as compared with a brake disc hub, so that the bolt is partially surrounded over a large area here. By contrast, the bolt comes to bear only in a partial region in a depression of the boss (or not necessarily over a large area there).

The bolt is preferably designed to be circular in cross section. It is also contemplated to design the bolt to be elliptic or to have a regular polygon in cross section.

Alternatively, the intermediate elements may take a strip form. This can be produced cost-effectively from a strip-shaped metal sheet.

Preferably, in this case, the two edges of the metal sheet which lie opposite one another are designed as thickenings, which edges delimit a surface which is depressed or "lowered" in relation to the thickenings and against which the assigned supporting element comes to bear.

In this case, furthermore, preferably, a projection is integrally formed on the side lying opposite the depressed surface and is seated in the depression, the latter being of a groove-shaped design.

Preferably, once again, the strip-shaped intermediate element consequently bears positively against the supporting element in the radial direction.

For radially securing the large-area intermediate element, too, the boss may have a depression in which a correspondingly integrally formed projection of the intermediate element is then seated, in which case both the projection and depression adapted to it may be designed such that the short covering distance between the boss and the intermediate element is obtained.

Other objects, advantages and novel features of the present invention will become apparent from the following detailed description of the invention when considered in conjunction with the accompanying drawings.

DETAILED DESCRIPTION OF THE DRAWINGS

Figure 1:
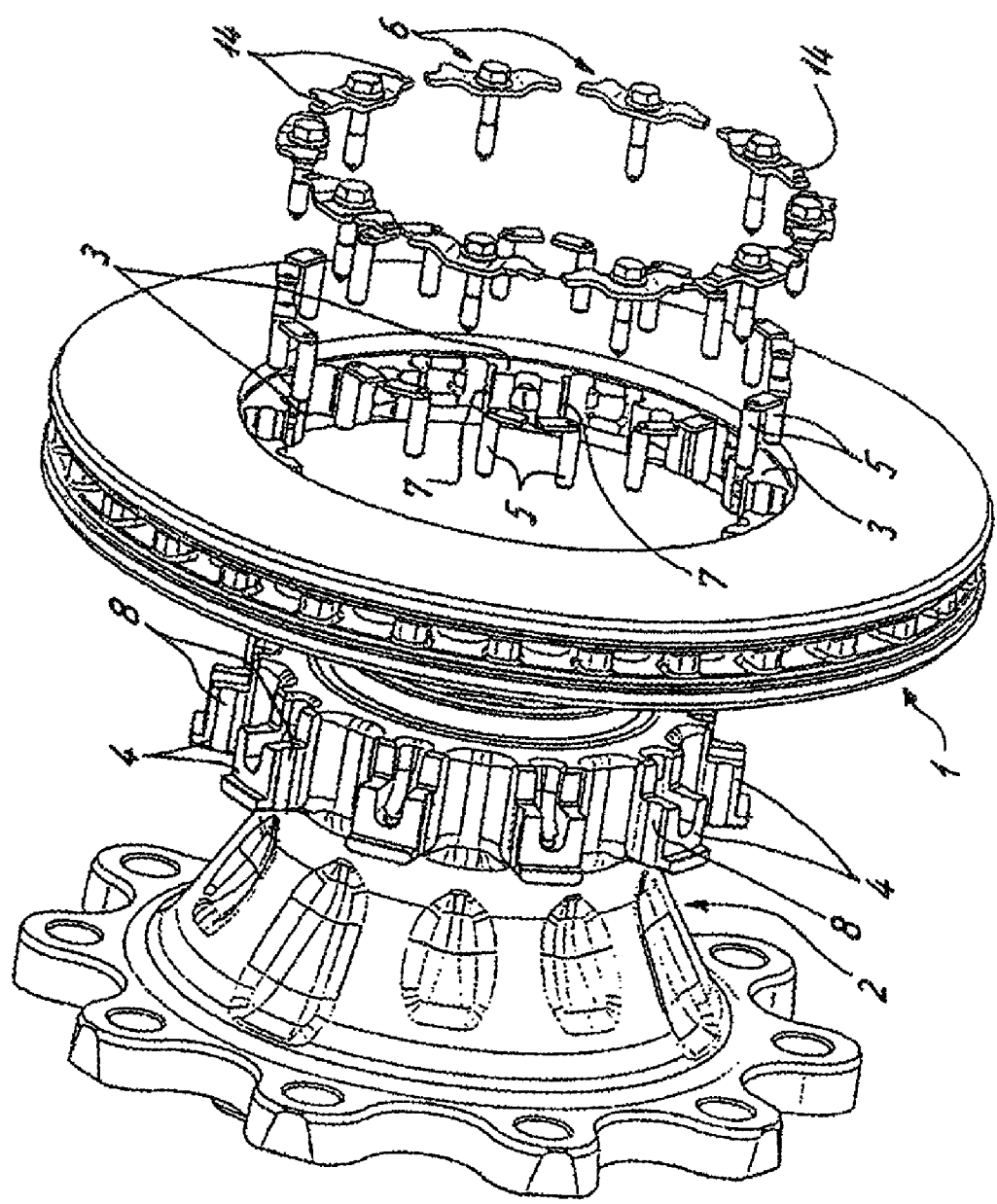
FIG. 1 shows a brake disc/hub connection according to the invention in an exploded illustration.

FIG. 1 illustrates an exploded illustration of a brake disc/hub connection for connecting a brake disc 1 to a brake disc hub 2. In this case, the annular brake disc 1 has supporting elements 3 on its inner circumference, while the brake disc hub 2 is provided on its outer circumference with bosses 4 which match with the supporting elements 3 in a toothed manner.

Between the supporting elements 3 and the bosses 4, interspaces 10 are formed, into which project intermediate elements 5, by which a braking torque can be transmitted from the brake disc 1 to the brake disc hub 2.

Figure 2:
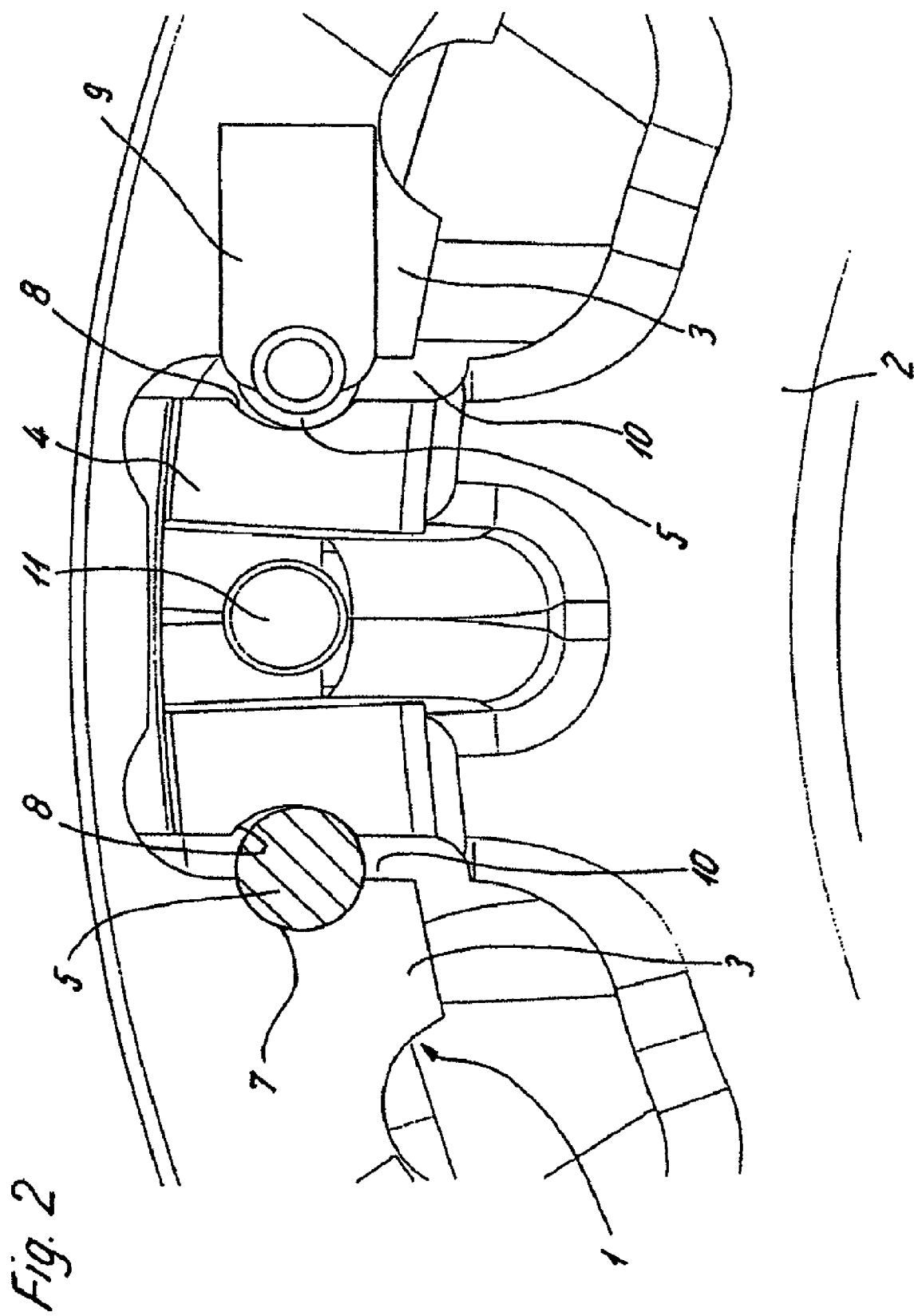
FIG. 2 shows a detail of the brake disc/hub connection according to FIG. 1 in a top view.

According to the invention, each intermediate element 5 comes to bear, secured radially by shaping, both against the assigned supporting element 3 and against the assigned boss 4 (see FIG. 2, for example).

In the exemplary embodiment of the invention, as shown in FIGS. 1 and 2, the intermediate elements 5 here consist of cylindrical bolts, which are seated in each case in a depression 7 of the supporting element 3 and in a depression 8 of the boss 4.

These depressions 8, 7 of the bosses 4 and of the supporting elements 3 are formed in surfaces which run completely or essentially (with an inclination of no more than 20°) radially with respect to the brake disc axis of rotation. In FIG. 2, in this case, the depressions 7, 8 extending in the circumferential direction are formed opposite one another. Furthermore, the intermediate elements 5 engage into the depressions 8, 7 in such a way that they are secured radially inwardly and outwardly in each case by way of the material, adjacent to the depressions, of the bosses 4 and of the supporting elements 3.

It can be seen on the left particularly in FIG. 2 that the depression 7 corresponds in its curvature to the radius of the intermediate element 5, so that the intermediate element is seated, free of play, with part of its surface area in the depression 7.

By contrast, the curvature of the depression 8 of the boss 4 is flatter than the radius of curvature of the intermediate element 5, so that the intermediate element 5 is covered in a radial direction, in regions, at a short distance on the side otherwise facing away from the brake disc hub 2. A clearance is thereby afforded, by which, in the event of radial thermal expansion, the brake disc 1 can move in the radial direction in relation to the brake disc hub 2, specifically until the intermediate element 5 bears in its upper region against the upper side of the depression 8.

The depression 8 thus forms a radial boundary for the intermediate element 5 and, therefore, for the brake disc 1. The boundary effectively prevents the situation where a brake disc segment may be driven radially outward in the event of a possible crack formation. To that extent, a securement against centrifugal force is achieved at a minimal outlay in structural terms.

In a manner known per se, the brake disc 1 is fastened axially to the brake disc hub 2 by use of a plurality of holding straps 6 distributed over the circumference, each holding strap 6 having two laterally extending spring tabs 14, which in each case cover one of the bolt-shaped intermediate elements 5 in order to secure them in an axial direction. A threaded bolt of the holding strap 6 is screwed into a threaded bore 11 of the boss 4.

The axial securing of the intermediate element in the other direction takes place by way of a tab 9, which is welded to the intermediate element 5 and which lies on the assigned supporting element 3 and to that extent forms a stop.

Instead of a round cross section, the bolt-shaped intermediate element 5 may also have another cross-sectional shape.

Figure 3:
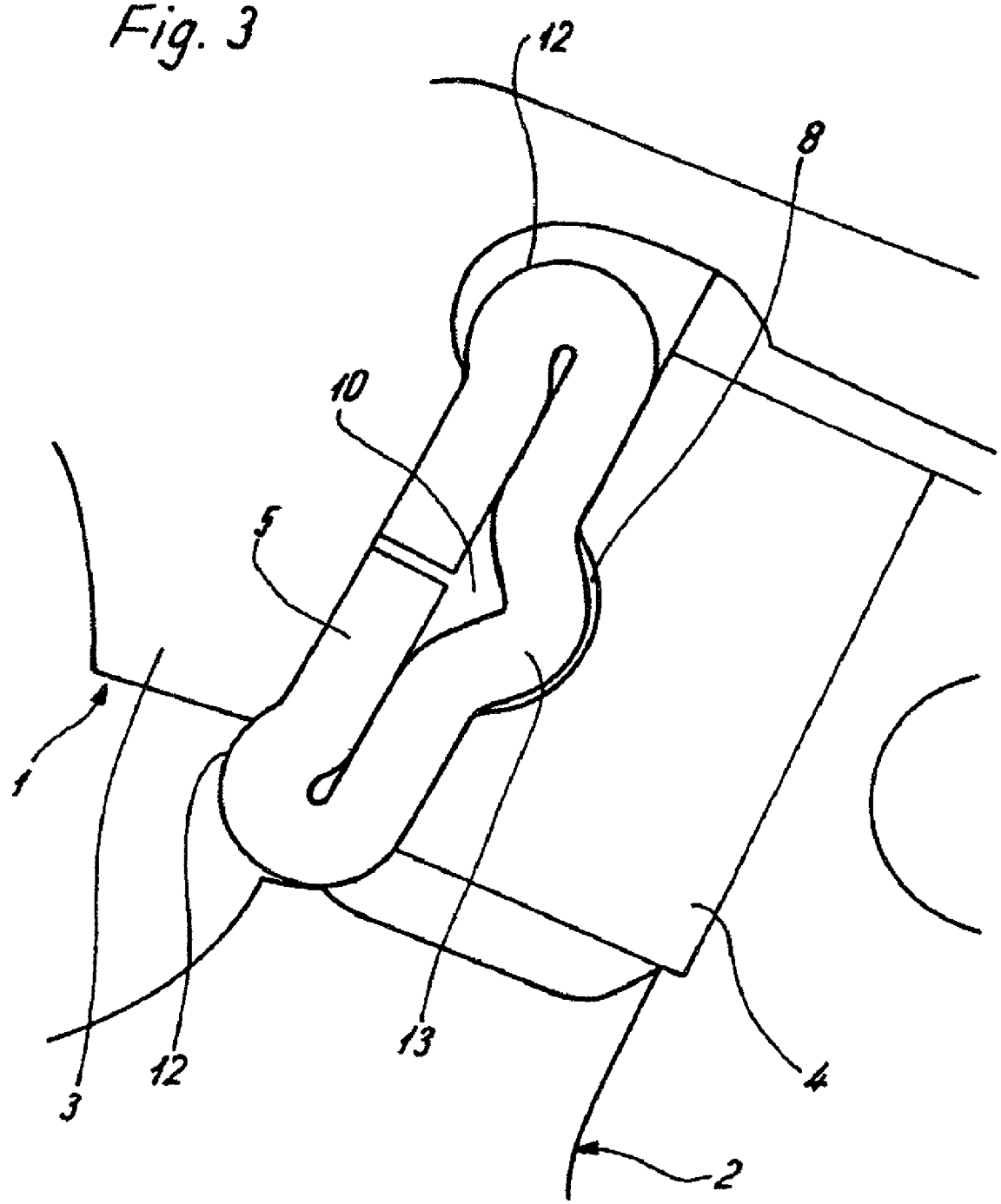
FIG. 3 shows a further exemplary embodiment of the invention in a part view, likewise in a top view.

As a further exemplary embodiment, in FIG. 3, the intermediate element is designed as an essentially strip-shaped sheet metal part, which has a thickening 12 formed in the outer edges at each of its two end regions, between which thickenings a part of the supporting element 3 is seated in an, as it were, depressed region. The intermediate element 5 is held, secured against displacement, on the supporting element 3 in the radial direction.

Opposite this depressed region, a projection 13 is provided on the intermediate element, which engages into the depression 8 of the boss 4. The projection 13 is seated with some play in the depression 8, but abuts against the wall of the depression 8 in the radial direction after the play is overcome in the event of an expansion of the brake disc 1. Moreover, the interspace 10 formed between the supporting element 3 and the boss 4 is filled virtually completely by the strip-shaped intermediate element 5.

Since each intermediate element 5 bears, secured radially by shaping, against the assigned supporting element 3 and against the boss 4, the disc is secured to the hub markedly more reliably than according to the prior art.

TABLE OF REFERENCE NUMBERS

1 Brake disc
2 Brake disc hub
3 Supporting element
4 Boss
5 Intermediate element
6 Holding strap
7 Depression
8 Depression
9 Tab
10 Interspace
11 Threaded bore
12 Thickening
13 Projection
14 Spring tab The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for connecting a brake disc and hub, the system comprising:
    supporting elements formed on an inner circumference of the brake disc;
    bosses formed on an outer circumference of the brake disc hub, each of said bosses having depressions formed in opposite side surfaces that run at least essentially radially with respect to a brake disc axis of rotation; and
    intermediate elements distributed in a circumferential direction between the brake disc hub and the brake disc, the intermediate elements projecting into interspaces provided between the bosses and the supporting elements, the intermediate elements ensuring a transmission of braking torque from the brake disc to the brake disc hub;
    wherein each intermediate element arranged in a corresponding interspace is seated against an assigned supporting element in a depression thereof and against an assigned boss in one of said depressions in said bosses, the intermediate element and the depressions of the supporting element and the boss being operatively shaped to secure the intermediate element in a radial direction; and
    wherein at least one of the assigned boss depression and the assigned supporting element depression has a radius of curvature that corresponds to a radius of curvature of the intermediate element, while the other of the assigned boss depression and the assigned supporting element depression has a radius of curvature greater than the radius of curvature of the intermediate element so that the intermediate element is seated with a slight radial play in said other of the boss depression and the supporting element depression, and radially movable within said other of the depressions upon expansion of the brake disc until a portion of the intermediate element bears against a wall of said other of the depressions.

2. The system according to claim 1, wherein, extending in a radial direction on a side of each intermediate element facing away from the brake disc hub, a portion of the assigned boss extends over the intermediate element and is spaced apart therefrom at a defined distance.

3. The system according to claim 1, wherein the intermediate element is a bolt that is seated in the supporting element depression and the boss depression.

4. The system according to claim 3, wherein the bolt has a circular cross-section.

5. The system according to claim 3, wherein the bolt has an elliptic cross-section.

6. The system according to claim 3, wherein the bolt has a regular polygonal cross-section.

7. The system according to claim 3, wherein the bolt has a hollow body construction.

8. The system according to claim 3, wherein the bolt has on an end face a tab bearing against an axially facing surface of the supporting element.

9. The system according to claim 1, wherein each intermediate element bears positively against the supporting element in the radial direction.

10. The system according to claim 1, wherein the intermediate elements comprise a steel having low thermal conductivity.

11. The system according to claim 1, wherein the supporting element and boss depressions are formed in associated supporting element and boss surfaces that extend essentially radially with respect to an axis of rotation of the brake disc.

12. The system according to claim 1, wherein the intermediate elements engage into the supporting element and boss depressions such that they are secured radially inwardly and outwardly via boss and supporting element material arranged adjacent to the depressions.

13. The system according to claim 1, wherein said expansion is thermal expansion.

14. A system for connecting a brake disc and hub, the system comprising:
    supporting elements formed on an inner circumference of the brake disc;
    bosses formed on an outer circumference of the brake disc hub, each of said bosses having depressions formed in opposite side surfaces that run at least essentially radially with respect to a brake disc axis of rotation; and intermediate elements distributed in a circumferential direction between the brake disc hub and the brake disc, the intermediate elements projecting into interspaces provided between the bosses and the supporting elements, the intermediate elements ensuring a transmission of braking torque from the brake disc to the brake disc hub;

wherein each intermediate element arranged in a corresponding interspace bears against an assigned supporting element in a depression thereof and against an assigned boss in one of said depressions in said bosses, the intermediate element and the depressions of the supporting element and the boss being operatively shaped to secure the intermediate element in a radial direction; and wherein a radius of curvature of the supporting element depression corresponds to a radius of curvature of the intermediate element, and further wherein a radius of curvature of the boss depression is greater than the radius of curvature of the intermediate element.

15. A system for connecting a brake disc and hub, the system comprising:

supporting elements formed on an inner circumference of the brake disc;

bosses formed on an outer circumference of the brake disc hub, each of said bosses having depressions formed in opposite side surfaces that run at least essentially radially with respect to a brake disc axis of rotation; and intermediate elements distributed in a circumferential direction between the brake disc hub and the brake disc, the intermediate elements projecting into interspaces provided between the bosses and the supporting elements, the intermediate elements ensuring a transmission of braking torque from the brake disc to the brake disc hub;

wherein each intermediate element arranged in a corresponding interspace bears against an assigned supporting element in a depression thereof and against an assigned boss in one of said depressions in said bosses, the intermediate element and the depressions of the supporting element and the boss being operatively shaped to secure the intermediate element in a radial direction; and wherein each boss is connected to a holding strap, the holding strap having two laterally extending spring tabs, each spring tab covering a respective end face of a respective intermediate element.

16. A system for connecting a brake disc and hub, the system comprising:

supporting elements formed on an inner circumference of the brake disc;

bosses formed on an outer circumference of the brake disc hub; and intermediate elements distributed in a circumferential direction between the brake disc hub and the brake disc, the intermediate elements projecting into interspaces provided between the bosses and the supporting elements, the intermediate elements ensuring a transmission of braking torque from the brake disc to the brake disc hub;

wherein each intermediate element arranged in a corresponding interspace bears against an assigned supporting element in a depression thereof and against an assigned boss in a depression thereof, the intermediate element and the depressions of the supporting element and the boss being operatively shaped to secure the intermediate element in a radial direction;

wherein the intermediate elements have a strip-shaped design;

wherein the strip-shaped design is formed by a strip-shaped metal sheet; and wherein the strip-shaped metal sheet has two opposing edges, each edge being configured to have a thickening, and further wherein the edges delimit a depressed surface on one side of the metal sheet that bears against an assigned supporting element.

17. The system according to claim 16, wherein a projection is integrally formed on a side of the metal sheet opposite the depressed surface, the projection being seated in the boss depression.

18. The system according to claim 16, wherein the strip-shaped metal sheet bears positively against the supporting element in the radial direction.

19. The system according to claim 16, wherein the supporting element is secured against displacement by the thickening at each of said edges.

20. The system according to claim 16, wherein the interspace is filled virtually completely by said strip-shaped metal sheet.

* * * * *